(12) United States Patent
Khusidman et al.

(10) Patent No.: US 9,663,662 B1
(45) Date of Patent: May 30, 2017

(54) SYSTEM AND METHOD FOR TIRE CONVERSION INTO CARBON BLACK, LIQUID AND GASEOUS PRODUCTS

(71) Applicant: Long Arc Technologies Corporation, Basking Ridge, NJ (US)

(72) Inventors: Vitaly B Khusidman, Warren, NJ (US); Vasily Jorjadze, Shoreham, NY (US); Tamaz Marsagishvili, Tbilisi (GE); Akaki Peikrishvili, Tbilisi (GE); Grigor Tatishvili, Tbilisi (GE)

(73) Assignee: Long Arc Technologies Corporation, Basking Ridge, NJ (US)

( * ) Notice: Subject to any disclaimer, the term of this patent is extended or adjusted under 35 U.S.C. 154(b) by 0 days.

(21) Appl. No.: 15/189,464

(22) Filed: Jun. 22, 2016

Related U.S. Application Data

(60) Provisional application No. 62/303,729, filed on Mar. 4, 2016.

(51) Int. Cl.
| | |
|---|---|
| *C09C 1/48* | (2006.01) |
| *C01B 3/02* | (2006.01) |
| *C10G 1/10* | (2006.01) |
| *C10B 53/07* | (2006.01) |
| *C10B 7/10* | (2006.01) |
| *C10B 57/02* | (2006.01) |

(52) U.S. Cl.
CPC ............ *C09C 1/482* (2013.01); *C01B 3/02* (2013.01); *C10B 7/10* (2013.01); *C10B 53/07* (2013.01); *C10B 57/02* (2013.01); *C10G 1/10* (2013.01); *C01P 2006/90* (2013.01); *C10G 2300/1003* (2013.01)

(58) Field of Classification Search
CPC .................................................. C09C 1/482
See application file for complete search history.

(56) References Cited

U.S. PATENT DOCUMENTS

| | | | |
|---|---|---|---|
| 4,647,443 A | 3/1987 | Apffel | |
| 5,728,361 A * | 3/1998 | Holley | .......... C09C 1/48 423/449.6 |
| 5,780,518 A | 7/1998 | Mulyarchik et al. | |
| 5,961,946 A | 10/1999 | Takegawa et al. | |
| 7,951,289 B2 | 5/2011 | Wu et al. | |
| 8,865,112 B2 | 10/2014 | Dulger et al. | |

* cited by examiner

*Primary Examiner* — Stuart Hendrickson
(74) *Attorney, Agent, or Firm* — Law Office of Ilya Libenzon

(57) ABSTRACT

A reactor for converting scrap tire material into output products, while allowing controlling the characteristics of the products within certain ranges, includes a pre-processing zone maintained at a first average temperature, at least one primary processing zone maintained at a second average temperature, at least one secondary processing zone maintained at a third average temperature, a post-processing zone that cools scrap tire material to a fourth temperature, at least one water injector that introduces water into the interior of the secondary processing zones, and potentially also the primary zone, and a transport mechanism that moves, and may mix, scrap tire material across the pre-processing zone, primary processing zone, secondary processing zone, and post-processing zone.

15 Claims, 12 Drawing Sheets

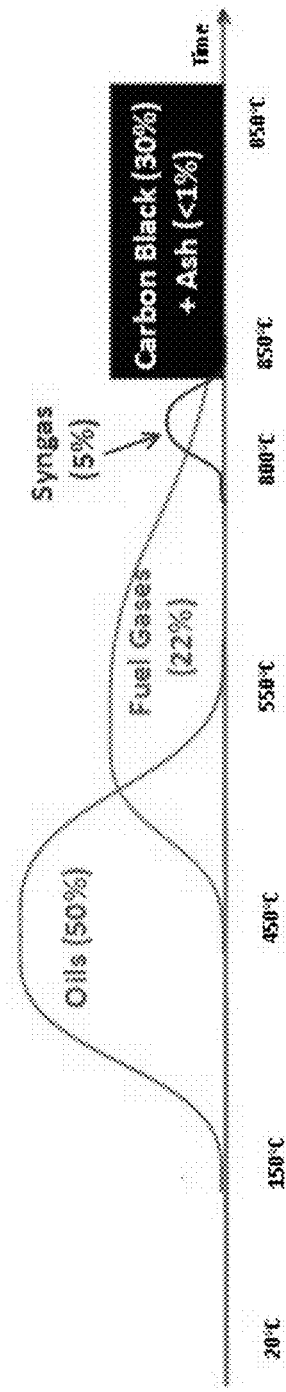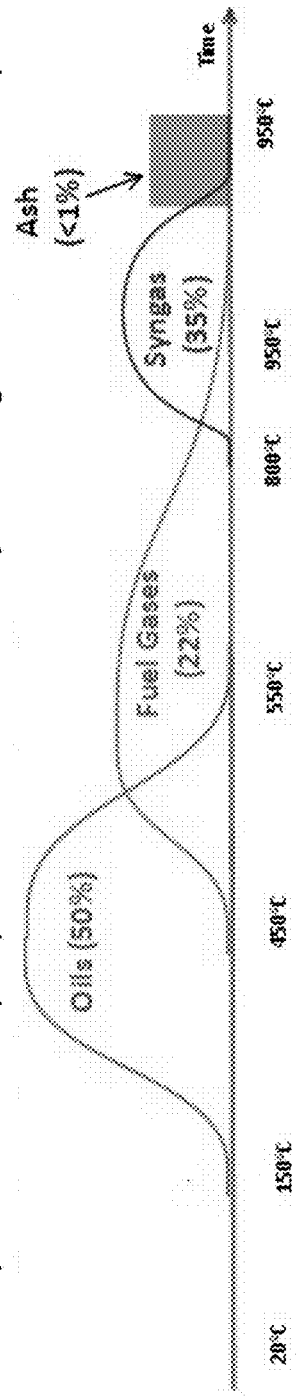

SYSTEM AND METHOD FOR TIRE CONVERSION INTO CARBON BLACK, LIQUID AND GASEOUS PRODUCTS

TECHNICAL FIELD

The device and methods disclosed herein relate generally to devices and methods for recycling scrap tire material using conversion processes and systems, and specifically to tire conversion to into carbon black, liquid, and gaseous products.

BACKGROUND ART

Approximately 1.5 billion tires are produced and around 1.4 billion new tires are sold worldwide each year, with 300 million tires sold annually in the United States alone. Each of those tires will eventually end as end-of-life tires. It is estimated that one car tire per person is discarded each year in the developed countries, and that around 4 billion of tires have been accumulated in stockpiles around the world. Significant additional quantities of tires are disposed of by other, less organized means. Tire piles often provide breeding grounds for pests and insects such as mosquitoes, because their shape and impermeability allow them to hold water for extended periods. Waste tire stockpiles are difficult to ignite; however, once ignited, tires burn very hot and are very difficult to extinguish, often burning for years and resulting in considerable release of air pollutants, including particulates. Tires are not biodegradable, and thus can remain to present the above hazards for many years after disposal. Used tires thus represent an environmental hazard and their elimination is an important task for human civilization.

Policies concerning the management of scrap tires and in general of any waste follow a hierarchical approach, attempting to alleviate the environmental impact according to the following order: waste minimization, reuse, recycling, energy recovery, and landfilling. Legislation related to waste management is driving the search for economic and environmental mechanisms that can contribute to solve the waste disposal problem. Scrap tire disposal in landfills is banned in the European Union and highly discouraged in the United States. Therefore, material recycling and/or energy recovery would appear to have a high potential for the future. Efforts to eliminate scrap tire material by recycling and other methods have been ongoing for some time, with jurisdictions such as the European Union and the United States making a concerted effort to encourage more environmentally friendly disposal methods. New methods such as pyrolysis to extract materials from tire scraps have been developed, and shown considerable promise for recovering energy and economically useful products such as metal, gas, oil, and carbon black from the tire scraps. Nonetheless, the methods used thus far have failed to recover materials efficiently enough to make pyrolysis of tires a viable pursuit. As a result, over 18% of scrap tires in the United States are still cast into landfills.

Therefore, there remains a need for an efficient system and process for recycling and/or extracting material from scrap tires.

SUMMARY OF THE EMBODIMENTS

In one aspect, a reactor for converting scrap tire material into output products under normal pressure includes a pre-processing zone maintained at a first average temperature, at least one primary processing zone maintained at a second average temperature, at least one secondary processing zone maintained at a third average temperature, a post-processing zone that cools scrap tire material to a fourth temperature, at least one water injector that introduces water into the interior of the secondary processing zone, and a transport mechanism that moves scrap tire material across the pre-processing zone, primary processing zone, secondary processing zone, and post-processing zone.

In a related embodiment, the post-processing zone further includes a cooling system around the post-processing zone. In another embodiment, the transport mechanism includes one or more integrated sections, each featuring both material advancing and mixing blades. In yet another embodiment, the screw conveyor has a variable lead. In another embodiment still, the screw conveyor further includes a plurality of mixing blades affixed to the screw conveyor.

A further embodiment also includes at least one tube, the at least one tube containing the pre-processing zone, the at least one primary processing zone, the at least one secondary processing zone, and the post-processing zone. In a related embodiment, the at least one tube further includes a plurality of tubes arranged in series. In an additional embodiment, the at least one tube further includes a plurality of tubes arranged in parallel. In yet another embodiment, the at least one tube also includes a first tube containing the pre-processing zone, at least one second tube containing the at least one primary processing zone, at least one third tube containing the at least one secondary processing zone, and a fourth tube containing the post-processing zone. A further embodiment still also includes a heating enclosure surrounding the portion of the at least one tube containing the primary and secondary processing zones, wherein the heating enclosure does not surround the portion of the at least one tube containing the post-processing zone.

In another aspect, a method for tire conversion includes heating scrap tire material to a first temperature in a pre-processing zone of a reactor. The method includes heating the scrap tire material to a second temperature in a primary processing zone of the reactor, heating the scrap tire material to a third temperature in a secondary processing zone of the reactor. The method includes introducing water to the secondary processing zone of the reactor. The method includes cooling down the solid remains to a fourth temperature in a post-processing zone of the reactor.

In a related embodiment, the first temperature is between 300 and 700 degrees Celsius. In another embodiment, the second temperature is between 700 degrees Celsius and 890 degrees Celsius. In still another embodiment, the third temperature is between 700 and 890 degrees Celsius. In an additional embodiment, the third temperature is 900 degrees Celsius or higher. Yet another embodiment, where the scrap tire material is introduced to the secondary processing zone at a first rate of mass per second, further includes varying the rate in mass per second of the introduction of water to control quality of produced materials. A further embodiment includes introducing water to the primary processing zone. An additional embodiment includes maintaining a near normal atmospheric pressure within the reactor.

In another aspect, carbon black is produced according to the process described above. In a related embodiment, the carbon black has a porosity of between 90 $m^2/g$ and 250 $m^2/g$.

Other aspects, embodiments and features of the disclosed device and method will become apparent from the following detailed description of the invention when considered in conjunction with the accompanying figures. The accompanying figures are for schematic purposes and are not intended to be drawn to scale. In the figures, each identical or substantially similar component that is illustrated in various figures is represented by a single numeral or notation at its initial drawing depiction. For purposes of clarity, not every component is labeled in every figure. Nor is every component of each embodiment of the device and method is shown, where illustration is not necessary to allow those of ordinary skill in the art to understand the device and method.

BRIEF DESCRIPTION OF THE DRAWINGS

The preceding summary, as well as the following detailed description of the disclosed device and method, will be better understood when read in conjunction with the attached drawings. It should be understood that the invention is not limited to the precise arrangements and instrumentalities shown.

FIG. 7A is a temperature graph illustrating materials extracted from the scrap tire material in one embodiment of the disclosed method; and FIG. 7B is a temperature graph illustrating materials extracted from the scrap tire material in one embodiment of the disclosed method.

DETAILED DESCRIPTION OF SPECIFIC EMBODIMENTS

Embodiments of the disclosed apparatus and method relate to the production of carbon black, oil, gas, and metal through the thermal treatment of used (scrap) tires or other rubber materials; embodiments of the disclosed reactor and method enable finer control over the quality and ranges of materials produced during conversion. Some embodiments achieve this through conversion that includes conversion of organic material at elevated temperatures in presence of water steam; this may create new molecules combining products from the scrap tire material with hydrogen and oxygen sourced from the water. The use of a sequence of temperature stages with the strategic introduction of water steam enhances all existing processes for conversion of scrap tires into carbon black. Water treatment makes it possible to control quality characteristics of the produced material for different industrial applications.

Figure 1A:
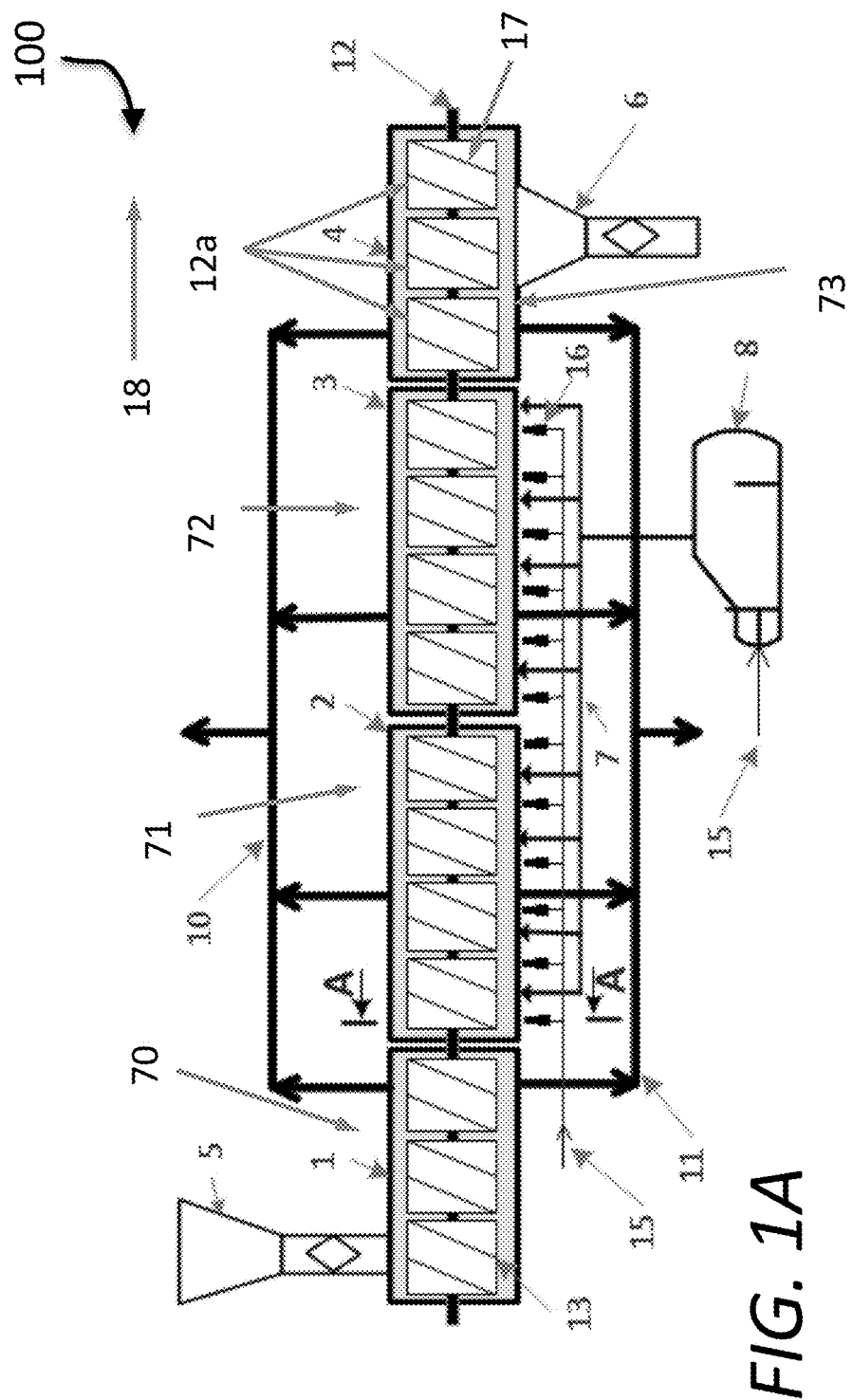
FIG. 1A is a schematic diagram illustrating one embodiment of the disclosed reactor.
Figure 1B:
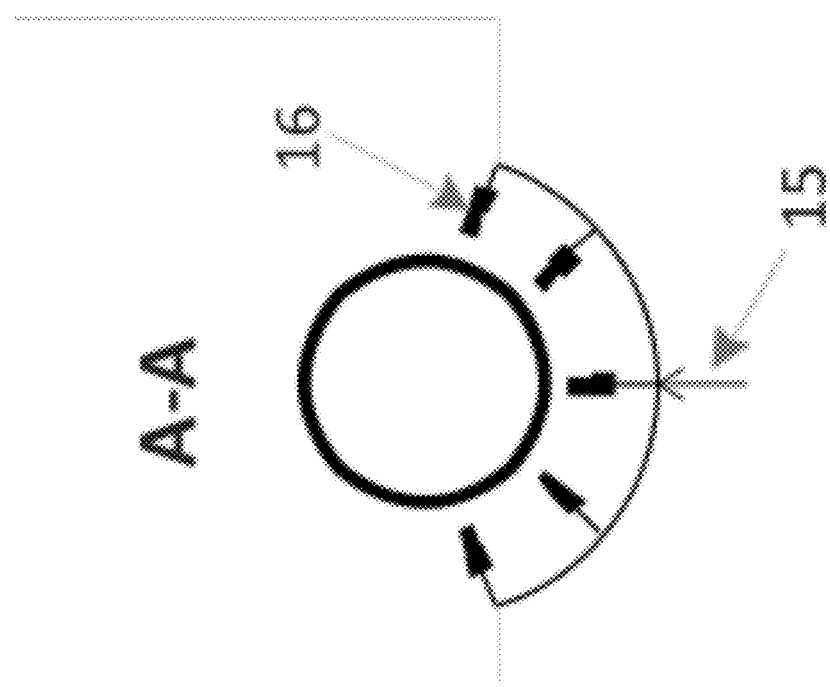
FIG. 1B is a schematic diagram showing a transverse cross-section of one embodiment of a disclosed reactor tube and gas jet array.

FIGS. 1A-1B depict some embodiments of a reactor 100 for performing conversion of scrap tire material. The reactor 100 includes a pre-processing zone 1 maintained at a first temperature. The reactor 100 includes at least one primary processing zone 2 maintained at a second temperature. The reactor 100 includes at least one secondary processing zone 3 maintained at a third temperature. The reactor includes a water injector system 7 that introduces water into the interior of the secondary processing zone 3. The reactor 100 includes a post-processing zone 4 maintained at a fourth temperature. The reactor 100 includes a transport mechanism 12, which may include one or more screw conveyors 13, that moves scrap tire material from the pre-processing zone to the primary processing zone, from the primary processing zone to the secondary processing zone and from the secondary processing zone to the post-processing zone.

Some embodiments of the disclosed apparatus and method involve conversion and extraction of resources from tire scrap material. Conversion is a generic term used hereafter to denote a variety of chemical processes including but not limited to scrap tire thermolysis, as set forth in further detail below. In one embodiment, tire scrap material is the material obtained from discarded or spent tires; tires may be annular components that cover and protect the wheels of vehicles such as automobiles, trucks, motorcycles, tractors, bicycles, and similar devices. The tire scrap material may contain any material or combination of materials used to construct tires. The tire scrap material may include one or more elastomeric polymers, which may be combined into copolymers. The elastomeric polymers may include synthetic or natural rubber material. The elastomeric polymers may include butadiene. The elastomeric polymers may include styrene. In addition to natural or synthetic rubber, the scrap tire material may include carbon black, which may be fine paracrystalline carbon material used for pigmentation and reinforcement of tires; the total content of carbon in the tire material may vary between 67% and 76% of the scrap tire material, depending on such factors as whether the tires were used for passenger or freight conveyance, whether they were intended for on or off-road use, and whether they were intended for summer or winter weather. The tire scrap material may include metal, such as steel used for reinforcement of tires such as steel-belted radials. The tire scrap material may include natural or synthetic textile material used to reinforce tires, such as silk, cotton, nylon, or para-aramid fibers. The tire scrap material may include sulfur, such as sulfur added for vulcanization. The tire scrap materials may include other additives such as zinc oxide and clay. For the sake of clarity, tire scrap material that is in the process of having materials extracted from it is referred to as scrap tire material, even though after passing through one or more stages of the process as disclosed below, some products may have been extracted from the scrap tire material, modifying its chemical or physical composition Some embodiments of the disclosed apparatus and method involve extracting products from scrap tire material using chemical conversion. In some embodiments, conversion is a process whereby a substance, such as scrap tire material, is broken down into simpler components using heat. Some embodiments of the disclosed apparatus and method involve extracting products from scrap tire material using thermolysis. In some embodiments, thermolysis involves heating of scrap tires or other rubber-containing material in presence of water steam, converting them into simpler and smaller organic compounds. In some embodiments of the disclosed method, a portion of the material produced is in excess of the original mass of the scrap tire material, which is accomplished by adding hydrogen and oxygen released from water molecules from the water introduced into the reactor by the water injectors 7; the use of some embodiments of the disclosed process thus unexpectedly produced a higher yield of useful materials than was possible according to previous methods. This process may be accompanied by production of carbon black, gas and oil. Industrial processes are usually implemented in continuous mode, in which new material constantly arrives at the reactor and solid products and any residue are continuously removed. Products produced as a result of conversion may include carbon black, gases, and oils; the gases and oils may have properties conducive to their use as fuel.

In some embodiments, the disclosed process and apparatus extract carbon black from the tire scrap material for commercial use. Carbon black may be classified according several characteristics, as defined by the American Society for Testing and Materials (ASTM) of West Conshohoken, Pa., of which three main characteristics may be of special importance: particle size, structure size and surface. Combination of these characteristics may mostly determine the value of the carbon black and its applicability to various industries. Embodiments of the disclosed method and apparatus have the advantageous ability to control those characteristics in the extracted carbon black. In some embodiments, the control of the carbon black characteristics is accomplished by measured addition of water and maintaining certain temperatures at certain stages of the material conversion, as described in further detail below.

The reactor 100 may be made of any material suitable for use in the method 600 described below. Material used to make the reactor 100 may include high temperature resistant steel. Material used to make the reactor 100 may include ceramic material. Material used to make the reactor 100 may include additional materials such as quartz or silica. The reactor 100 may include one or more tubular sections, in which the scrap tire material is placed and heated. The heating may be accomplished using any process suitable for achieving the first, second, and third temperatures. For instance, the heating may be accomplished using gas or liquid fuel jets 16; in some embodiments, the jets 16 are arranged in an arcuate array around a portion of the tube, as shown in FIG. 1B. In other embodiments, heating elements wrapped around the tube may be used to heat the tube; the heating elements may be electric.

Figure 2A:
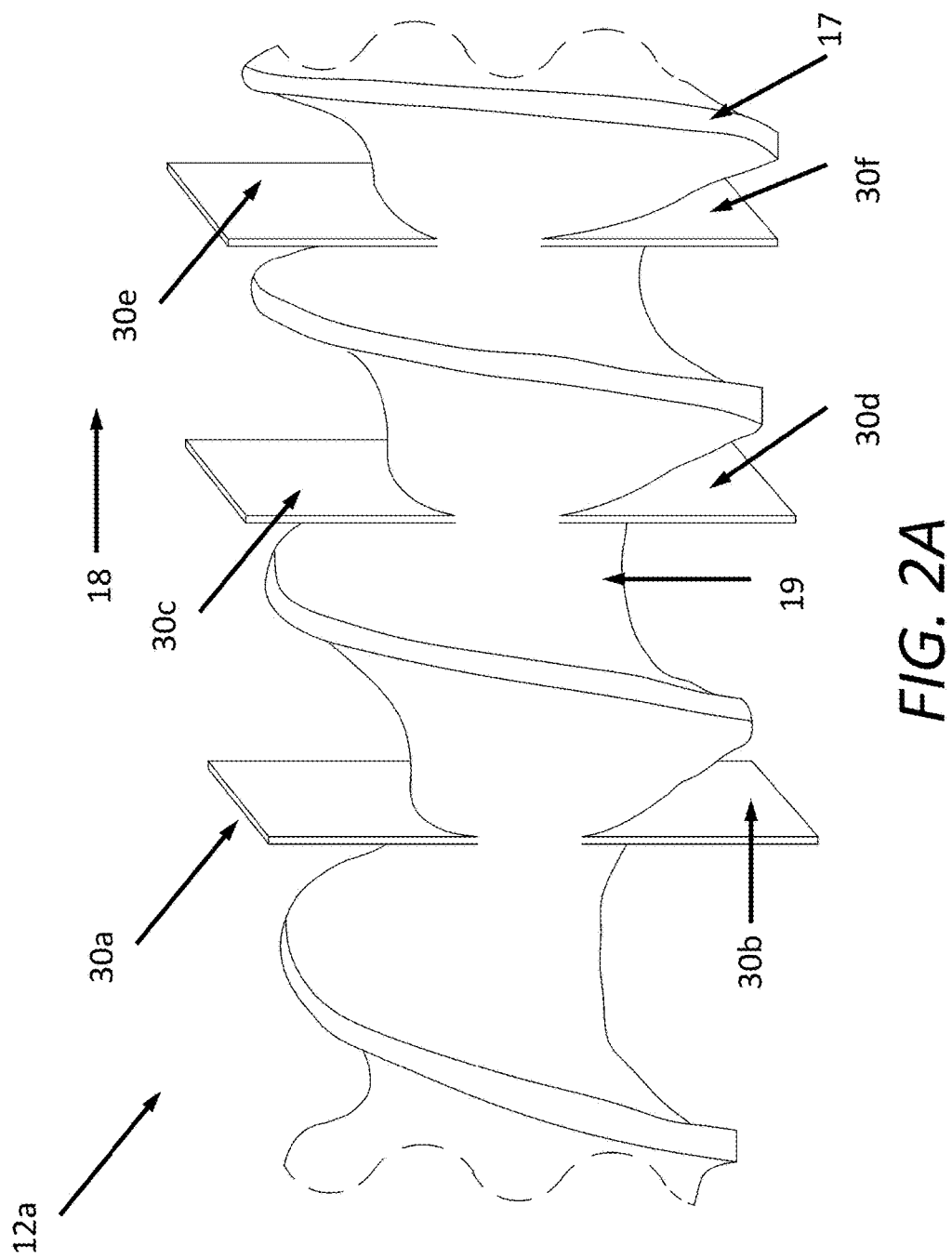
FIG. 2A is a schematic diagram illustrating one embodiment of a screw of a screw conveyor.

The reactor 100 includes a transport mechanism 12 that moves scrap tire material from the pre-processing zone to the primary processing zone, from the primary processing zone to the secondary processing zone and from the secondary processing zone to the post-processing zone. In some embodiments, the transport mechanism 12 further includes a screw conveyor 13. In one embodiment, a screw conveyor 13 is a device having at least one screw 12a that rotates in place, with one or more threads 17, also known as helical blades, whose rotation causes the scrap tire material to move in a direction 18 axial to the rotation of the at least one screw. FIG. 2A illustrates one embodiment of a screw 12a included in the screw conveyor. The screw 12a may be a helical screw; the one or more threads 17 of the screw may be helical. The helical screw may have a central shaft 19 to which the helical threads are fixed. The screw conveyor may have a single screw that extends for substantially all of the length of the screw conveyor. The screw conveyor may have multiple screws. The screw conveyor may have a plurality of screws in series; for instance, where the reactor has more than one tube connected in series, the screw conveyor may include at least a first screw in a first tube and at least a second screw in a second tube. The screw conveyor may include a plurality of screws in parallel; for instance, where the reactor includes two or more tubes in parallel, the screw conveyor may include a first screw in a first tube and a second screw in a second tube parallel to the first tube. The screw conveyor may include some screws in parallel and some in series. The multiple screws may be mechanically linked so that the rotation of a first screw drives the rotation of a second screw. In other embodiments, each of the multiple screws is driven by a separate mechanism. Some screws may be mechanically linked to each other while others are driven by separate mechanisms.

The screw conveyor may cause the scrap tire material to advance at different rates in different portions of the conveyor. In some embodiments, where the screw conveyor includes multiple screws, a first screw may turn at a first rate, while a second screw turns at a second rate that differs from the first rate; as a result, the first screw may move scrap tire material more rapidly or less rapidly than the second screw, for a given lead or pitch. In some embodiments, the rotation speed of at least one screw is regulated to vary the speed of advancement of scrap tire materials. In one embodiment, the reactor 100 includes one or more manual controls permitting a user to vary the speed of rotation of one or more screws; for instance, the user may observe sensor outputs or other information indicating how the conversion process is progressing, and may speed up or slow down one or more conveyor screws to ensure that the process is performed more slowly (e.g. to ensure a more complete conversion) or more rapidly (e.g., to increase throughput where the rate of conversion is higher than the rate of movement of material through the reactor). In other embodiments, a processor (not shown) such as a microprocessor, computer, or other analog, digital, or mechanical automated control system changes the rate of rotation of one or more screws in response to one or more detected changes in the progress of conversion.

In other embodiments, the screw conveyor has a variable lead. In one embodiment, the lead is the amount of axial displacement caused by as single rotation of the screw. The lead may be varied by varying the pitch, as illustrated in FIG. 2A, where the pitch is defined as the axial distance between the peaks of adjacent threads; for instance, the lead may be increased by increasing the pitch. The lead may be varied by adding or removing threads, and thereby increasing or decreasing the number of "starts" on a given screw; for instance, adding a second start at a given pitch may double the lead. In some embodiments, the lead is varied both by adjusting the pitch and the number of threads. The lead may be varied on a single screw; for instance, as shown in FIG. 2A, one screw may have a varied pitch. Likewise, a single screw may have one portion with a greater number of threads and another portion with a lesser number of threads. In other embodiments, the lead is varied from one screw to another; for instance, a first screw may have a first lead and a second screw may have a second lead differing from the first lead. In some embodiments, screw conveyor has a higher lead toward the beginning of the reactor, gradually reducing to a lower lead toward the end of the reactor, accounting for the loss of mass as the scrap tire material is converted and the resulting products are extracted.

Figure 2B:
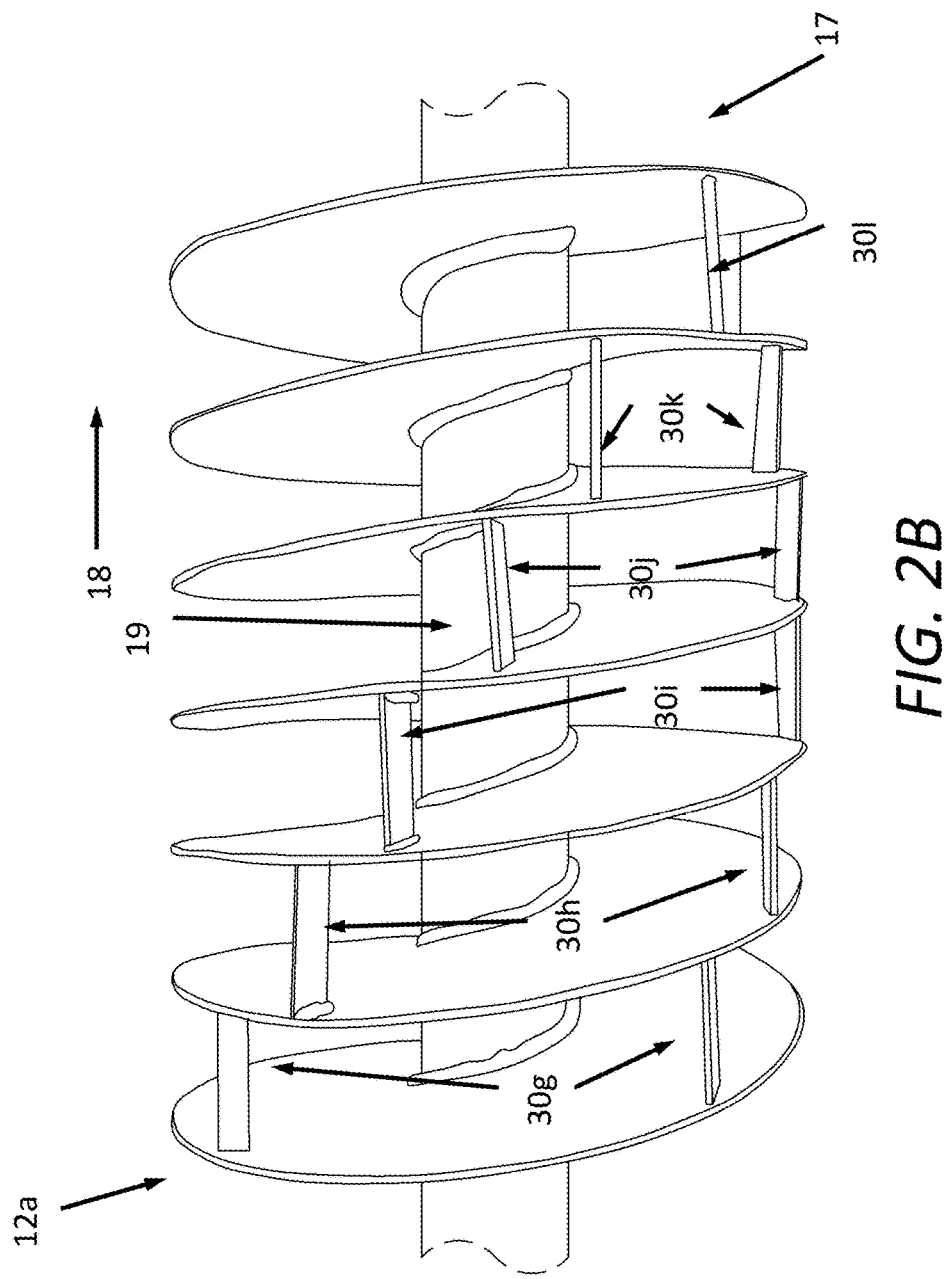
FIG. 2B is a schematic diagram illustrating one embodiment of a screw of a screw conveyor.
Figure 2C:
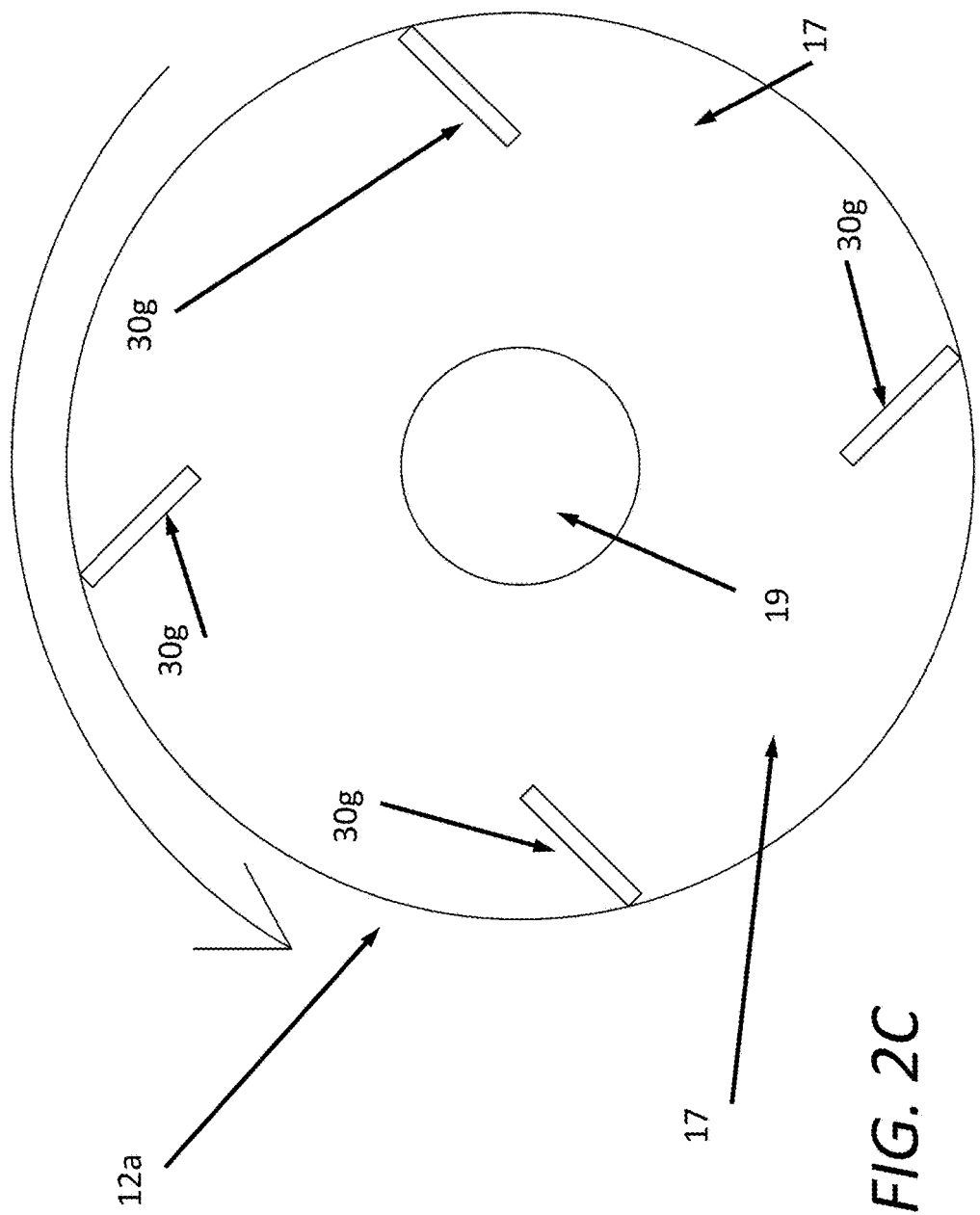
FIG. 2C is a schematic diagram illustrating a cross-section one embodiment of a screw of a screw conveyor.

In some embodiments, the transport mechanism 12 includes integrated sections, each featuring both material advancing and mixing blades. For instance, the screw conveyor may further include one or more mixing blades. In some embodiments, the screw conveyor includes a plurality of mixing blades 30a-l affixed to the screw conveyor; the mixing blades 30a-l may rotate with the same angular velocity as the screw 12a to which the mixing blades are fixed. In some embodiments, the mixing blades 30a-l are positioned between the threads of the screw 12a. For the purposes herein, a mixing blade 30a-l is positioned between two adjacent threads if the mixing blade 30a-l is positioned in a valley between two adjacent crests, traveling in the axial direction, of the threads 17 of the screw, as illustrated in FIGS. 2A-C.

There may be less than one blade 30a-l per step of the threads, where a step is passage from one trough between a first thread peak and a second thread peak to a trough on the other side of one of the second thread peak in the axial direction. There may be one or more blades 30a-l per step of the threads; for instance, as shown in FIG. 2A, there may be two mixing blades 30a-f per step of the screw. As another example, as shown in FIG. 2C, there may be four mixing blades 30g per step. The number of mixing blades per step may vary over the length of the screw 12a. The blades may occur at the substantially the same degrees of rotation for each step of the threads, as shown in FIG. 2A: that is, a first blade 30a may be positioned substantially on the same line parallel to the axis of the screw 12a as a corresponding blade 30c in the subsequent step of the threads. In other embodiments, as shown in FIG. 2C, the position of the blades in each successive step is shifted with respect to the position of the blades in the previous step. For instance, as shown in FIG. 2B, blades 30h may be positioned some offset number of degrees or radians from the corresponding blades in the previous step 30g; in some embodiments that offset is fixed, so that the successive steps of blades 30g-l form a substantially regular helical pattern. In other embodiments, the offset number varies according to some function of the length of the screw; the offset number may also vary arbitrarily.

The mixing blades 30a-l may have any shape conducive to stirring up scrap tire material. For instance, the faces of the mixing blades 30a-l may have any curved or polygonal perimeter, or any combination of curved or polygonal forms. The blades 30a-l may have one or more projections such as fingers or teeth. The blades 30a-l may have one or more indentations. There may be one or more holes through the blades 30a-l. The faces may be oriented orthogonally to the axis of the screw 12a, parallel to the axis of the screw, or at any other angle with respect to the axis of the screw. The blades 30a-f may be substantially straight; the blades 30a-f may be twisted. The blades 30a-f may present convex or concave surfaces.

The blades 30a-l may be positioned at any angle relative to lines drawn from the axis of the screw 12a and intersecting the blades 30a-l. For instance, where the faces of the blades 30a-l are substantially planar, the faces of the blades 30a-l may be parallel to lines drawn radially from the axis of the screw 12a and intersecting the blades, as shown in FIG. 2A. In other embodiments, the blades form a non-zero angle with the radially drawn lines intersecting the blades, as shown in FIGS. 2B-C. For instance, as shown in FIG. 2C, which illustrates a cross-sectional view of the embodiment of the screw with mixing blades illustrated in FIG. 2B, each blade 30g-l may form an angle of approximately 45 degrees ($\pi/4$ radians) with a radially drawn line intersecting the edge of the blade closest to the axis of the screw 12a. In some embodiments, the angle that each blade forms with a radial line from the axis intersecting the nearest edge of the blade varies from one blade to the next. In some embodiments, where the blades are angled as shown in FIG. 2C, they rotate in a counter-clockwise direction as shown; in other words, the screw 12a may rotate so the blades 30g-l lead with the edges further from the axis of rotation.

Pairs of the blades 30a-l may be positioned opposite each other across the axis of rotation of the screw 12a. For instance, where the blades are positioned orthogonally to the axis, a first blade 30a may project orthogonally to the axis of the rotation of the screw 12a in a first direction, and a second blade 30b may project orthogonally to the axis of the rotation of the screw 12a in a second direction approximately 180 degrees ($\pi$ radians) about the axis of rotation from the first direction; in some embodiments, the first blade is orthogonal to the same point on the axis as the second blade, while in other embodiments, the first blade is orthogonal to a different point on the axis from the second blade.

In some embodiments, as shown in FIG. 2A, the mixing blades 30a-f are attached to the shaft 19. In other embodiments, as shown in FIG. 2B, the mixing blades 30g-l are not connected directly to the shaft 19. For instance, each blade 30g-l may have a first end attached to one of the threads 17 of the screw 12a. In some embodiments, each blade 30a-l is positioned between two adjacent threads, and has a first end attached to a first thread and a second end attached to a second thread. In some embodiments, there is a space between each mixing blade 30g-l and the shaft 19. As a non-limiting example, for instance where the diameter of the reactor tube is 50 centimeters, where the threads, for instance of a screw conveyor as depicted in FIG. 2C, are regularly positioned 10 centimeters apart, each blade 30g-l may be 10 centimeters long, with an end fixed to each of two adjacent threads, and width of 2 centimeters; as a result, there may be a substantial amount of space between each blade 30g-l and the shaft 19.

In some embodiments, configuration of the mixing blades 30a-l varies over the length of one screw 12a; for instance, the angle, frequency of blades per rotation, surface area, shape, and space between blades and the shaft or threads may vary over the length of the screw 12a. As a further example, in one embodiment, the screw conveyor has a constant lead and mixing blades 30a-l. Another embodiment combines integrated mixing blades 30a-l with a variable lead. Likewise, the configuration of blades may vary from one screw to another. The configuration of blades may vary from one zone to another of the reactor 100; for example, the mixing blades 30a-l may be present on all screws in the primary 2 and secondary 3 processing zones, and absent from all screws in the pre-processing zone 1 and post-processing zone 4.

The rotation of the blades may stir the scrap tire material while the threads cause the tire material to advance axially along the screw conveyor. In some embodiments, mechanical agitation of the scrap tire material and variations in the rate of movement along the screw conveyor of the scrap tire material enables greater control over the quality and range of products extracted during conversion. In some embodiments, this improves the quality and completeness of material mixing, which in turn enables equal heating of the entire mass of the scrap tire material moved through the reactor despite low thermal conductivity of the material; this in turn may guarantee the quality of the output products.

Figure 2D:
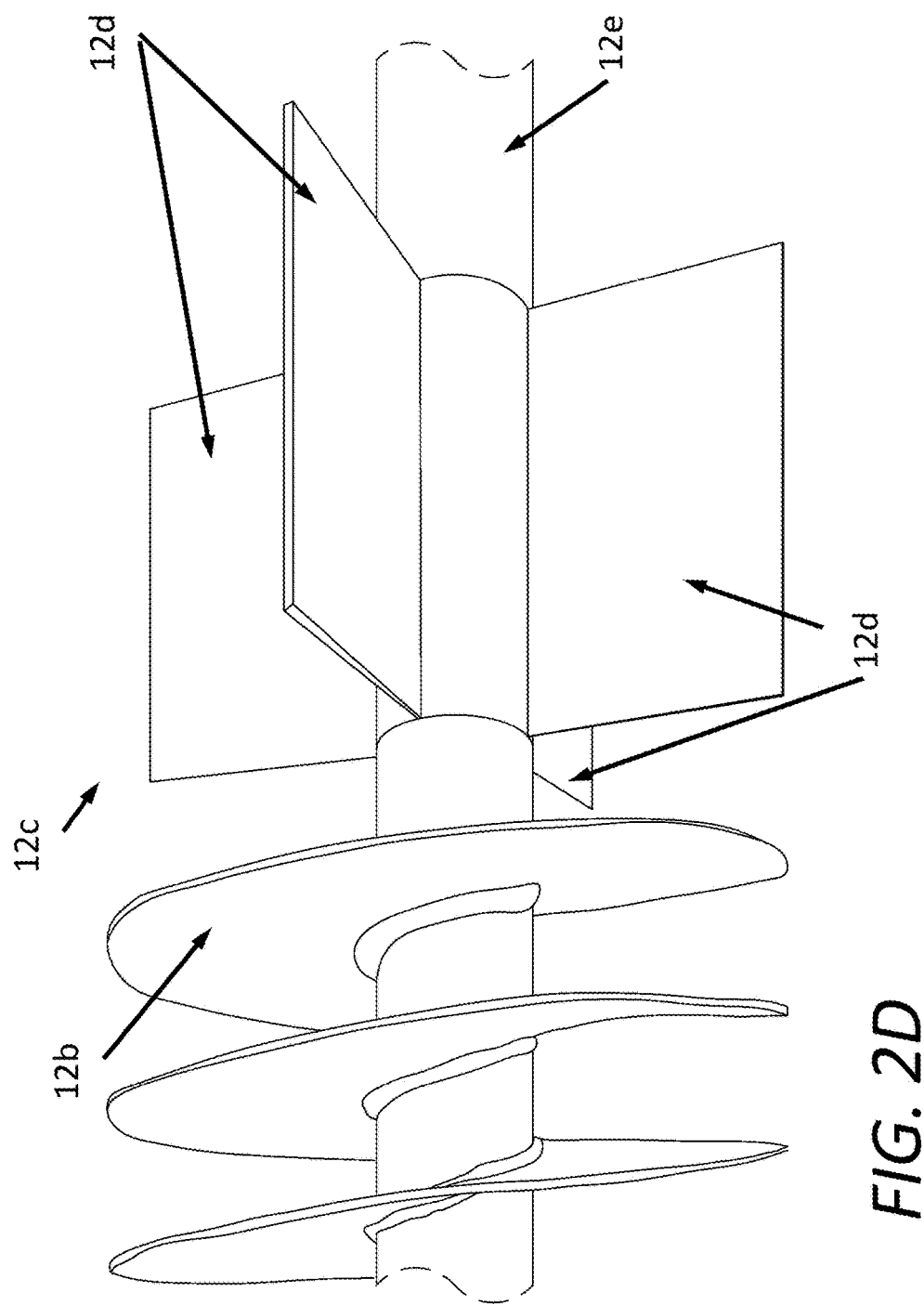
FIG. 2D is a schematic diagram illustrating an embodiment a transport mechanism having alternating advancing and mixing sections.

In other embodiments, as shown in FIG. 2D, the transport mechanism 12 includes one or more material advancing sections 12b and one or more material blending sections 12c. In some embodiments, the one or more material advancing sections 12b alternate with one or more sets of blending sections 12c. The material advancing sections 12b may be any material advancing mechanism as described above; for instance, the material advancing sections 12b may include one or more screw conveyors, which may have varying or fixed leads, and may turn at varying or fixed speeds, as described above. The blending sections 12c may include one or more mixing blades; the mixing blades may have any form suitable for mixing blades 30a-l as described above. For instance, the mixing blades may be attached to a rotating shaft 12d, which may be the same shaft as an adjacent screw conveyor, or may be a separate shaft. The shaft 12d of the at least one material blending section 12c may turn at a constant or variable speed; the shafts of two different material blending sections 12c may turn at two different speeds. In some embodiments, the shaft 12d of one material blending section 12c may have a variable speed, regulated by a user or a processor as described above regarding the regulation of the speed of rotation of a screw 12a. The mixing blades 12e may project radially from the shaft, or form any angle with respect to lines drawn radially from the axis of rotation of the shaft.

The reactor 100 may include at least one tube, the at least one tube containing the pre-processing zone, the at least one primary processing zone, the at least one secondary processing zone, and the post-processing zone. The at least one tube may be one tube; for instance, in some embodiments, the reactor 100 includes a single tube divided into at least the pre-processing zone 1, the at least one primary processing zone 2, the at least one secondary processing zone 3 and the post-processing zone 4. In other embodiments, the at least one tube is a plurality of tubes. For example, as illustrated in FIG. 1A, the at least one tube may include a first tube 70 containing the pre-processing zone, at least one second tube 71 containing the at least one primary processing zone, at least one third tube 72 containing the at least one secondary processing zone, and a fourth tube 73 containing the post-processing zone.

Figure 3A:
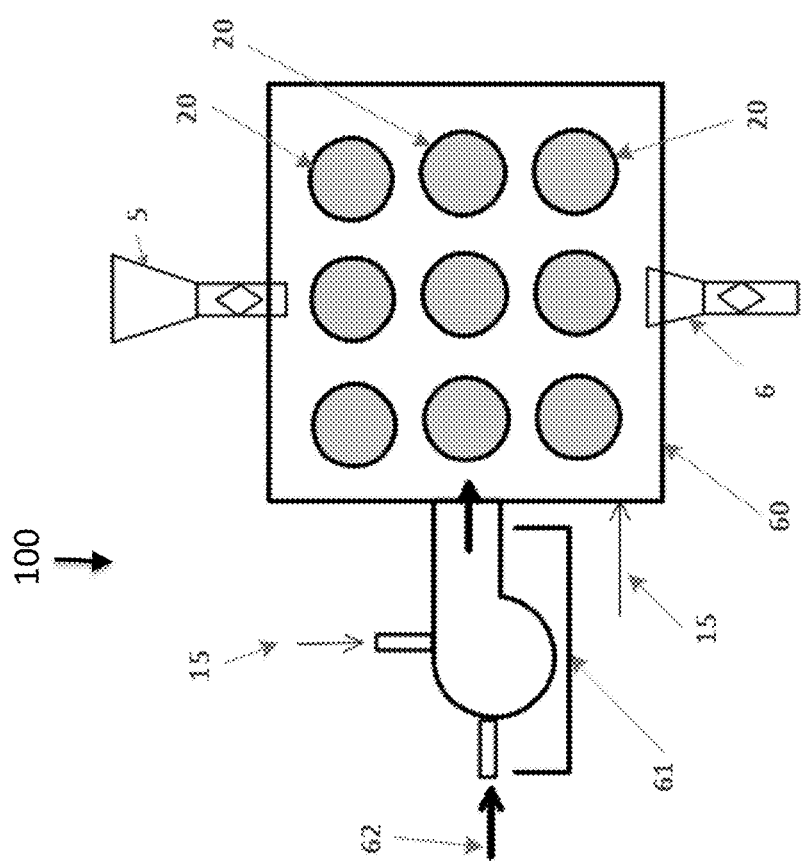
FIG. 3A is a schematic diagram showing a cross section of one embodiment of the disclosed reactor with a parallel arrangement of tubes.
Figure 3B:
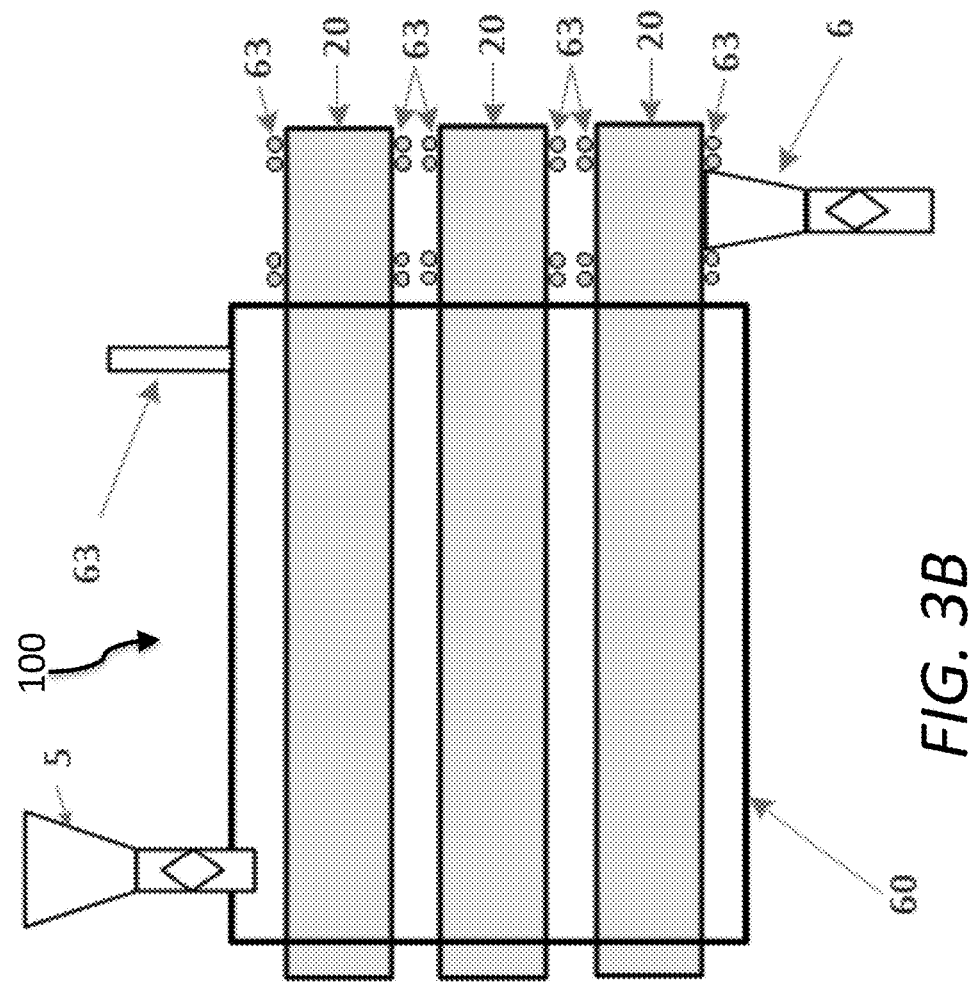
FIG. 3B is a schematic diagram showing one embodiment of the disclosed reactor with a parallel arrangement of tubes.

In some embodiments, as illustrated in FIGS. 3A-B, some of the at least one tube is surrounded by a heating enclosure 60. The common enclosure may be heated by a gas burner 61 having an air intake 62 and an exhaust to an internal temperature of approximately 300 degrees Celsius; the enclosure 60 may have an exhaust 63 allowing exhaust from the gas burner 61 to escape. In some embodiments, while the temperature inside the enclosure 60 is approximately 300 degrees Celsius; the temperature may range from 300 degrees Celsius at the external walls of the enclosure to 700 degrees Celsius or higher in internal areas near to where gas burners are located. In some embodiments, areas of the enclosure adjacent to the heated processing zones have respective higher temperatures. For instance, in some embodiments, the pre-processing zone is heated by enclosure atmosphere, while the primary and the secondary processing zones are additionally heated by gas burners. The enclosure atmosphere may be 300 degrees Celsius, as a non-limiting example. In some embodiments, the heating enclosure surrounds the portion of the at least one tube containing the primary and secondary processing zones, while the heating enclosure does not surround the portion of the at least one tube containing the post-processing zone. The post-processing zone may be additionally wrapped in a cooling system, as set forth in further detail below. Persons skilled in the art will be aware that the heating enclosure 60 may be used with any configuration of zones and tubes described herein.

Figure 4:
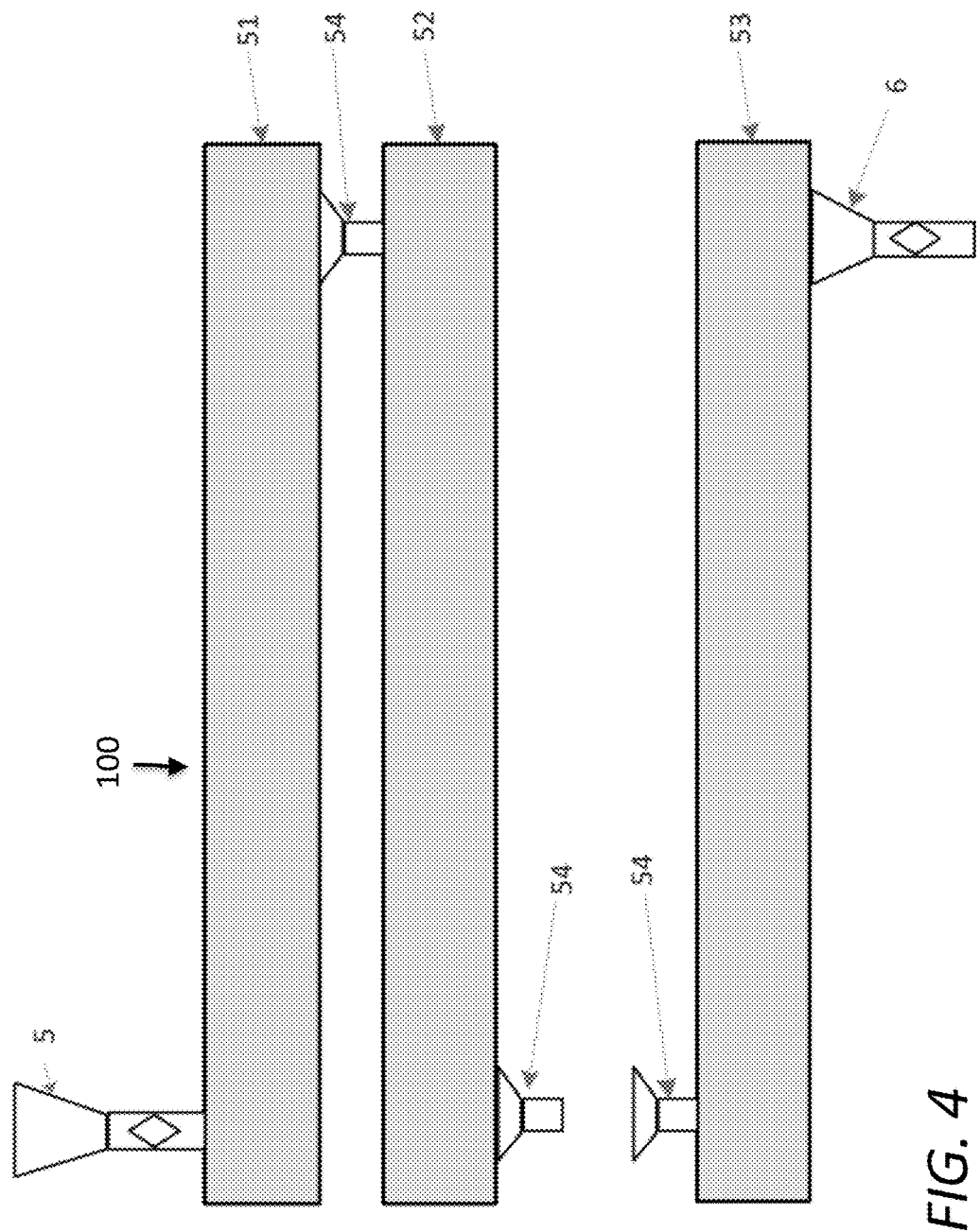
FIG. 4 is a schematic diagram illustrating an embodiment of the disclosed reactor with tubes set in series.

The at least one tube may include a plurality of tubes arranged in series. For instance, as shown in FIG. 4, the reactor 100 may include a plurality of vertically arranged tubes 51, 52, 53 in series. Scrap tire material may advance from one tube 51 to the next tube 52 by gravity; for instance, there may be at least one vertical tube 54 connecting one tube 51 to the next, into which scrap tire material may fall upon advancing to an upper opening of the at least one vertical tube 54; the transport mechanism 12 in the subsequent tube 52 may then advance the scrap tire material through that tube. The at least one vertical tube 54 may include a funnel-shaped portion; the at least one vertical tube 54 may include a hopper. In some embodiments, the pre-processing zone and a first primary zone are contained in a first tube 51, a second primary processing zone is contained in a second tube 52 connected to the first tube 51, and the secondary processing zone and the post-processing zone are contained in a third tube 53 connected to the second tube 52. In some embodiments, each zone is in a separate tube. In other embodiments, two or more of the zones 1-3 are contained in one tube; the proportion of total length of the tubes 51-53 occupied by each zone 1-3 may be determined by the amount of time that it takes to process the scrap tire material in each zone; for instance, if the scrap tire material spends more time in the primary processing zone 2, the primary processing zone 2 may occupy a greater proportion of the total length of the tubes. The plurality of the reactor tubes may also allow maintaining distinct temperatures and steam density conditions from one zone to another by maintaining a first temperature and steam density condition in a first tube and a second temperature and steam density condition in a second tube.

In other embodiments, the at least one tube further comprises a plurality of tubes arranged in parallel. In other words, in some embodiments, as shown in FIGS. 3A-3B, the reactor 100 includes one or more parallel tubes 20 through which the scrap tire material passes. For instance, the reactor 100 may include two or more parallel tubes each of which has a pre-processing zone, a primary processing zone, a secondary processing zone, and a post-processing zone. In some embodiments, there are four parallel tubes. The input hopper 5 may feed into all four tubes by way of a common gate that splits into four shafts, each shaft leading to one of the four tubes; the scrap tire material may each of the four shafts in substantially equal quantities under the force of gravity and/or mechanical assistance.

The pre-processing zone 1 is maintained at a first temperature, as described in further detail below. In some embodiments, the first temperature is between 300 degrees Celsius and 700 degrees Celsius. The scrap tire material may gradually heat up to the first temperature as the scrap tire material moves through the pre-processing zone 1. The primary processing zone 2 is maintained at a second temperature; the second temperature may be between 700 degrees Celsius and 890 degrees Celsius. The scrap tire material may gradually heat up as it moves through the primary processing zone 2.

The reactor 100 includes a secondary processing zone 3 maintained at a third temperature. The third temperature may be between 700 degrees Celsius and 890 degrees Celsius, or the third temperature may be 900 degrees Celsius or higher, depending on the desired outcome, as described in further detail below. The reactor 100 includes a water injector system 7 that introduces water into the interior of the secondary processing zone 3. The water injector system 7 may introduce water in the form of liquid, vapor, or a combination of water vapor and liquid water. The water injector system 7 may include one or more nozzles (not shown) that inject the water into the respective zones. The one or more nozzles may be connected via tubes to a water steam generator 8 heated by the gas produced by the conversion process. The water steam generator 8 may be a boiler; in some embodiments, the water steam generator 8 is heated using gases extracted during the process 600 described below. The water may be added as described below at various stages of the process. For instance, in some embodiments, the water injector system 7 also adds water to the primary processing zone 2. In some embodiments, introducing the water into the secondary or primary zones enhances control over the quality and quantity of extracted products.

The reactor 100 includes a post-processing zone 4 maintained at a fourth temperature. The fourth temperature may be between 80 degrees Celsius and 300 degrees Celsius. The temperature may drop further during the extraction of materials as described in further detail below. In some embodiments, as shown in FIG. 3B, the post-processing zone 4 includes a cooling system 63 around the post-processing zone; where the post-processing zone 4 is contained in the at least one tube, the cooling system 63 may be wrapped around the at least one tube in the area of the post-processing zone 4. The cooling system 63 may include one or more tubes through which fluids flow; the fluids may absorb heat from the post-processing zone 4 and exchange the heat with another object. The tubes may be constructed of heat-conducting material such as metal. The fluids may be pumped or otherwise forced through the tubes. In some embodiments, the cooling system is in thermal contact with the pre-processing zone; for instance, the fluids in the tubes may transport heat to the pre-processing zone to increase the temperature of the pre-processing zone. In some embodiments, the water injector system 7 is configured to introduce liquid water, water vapor, or a combination of liquid water and water vapor into the post-processing zone.

Figure 5:
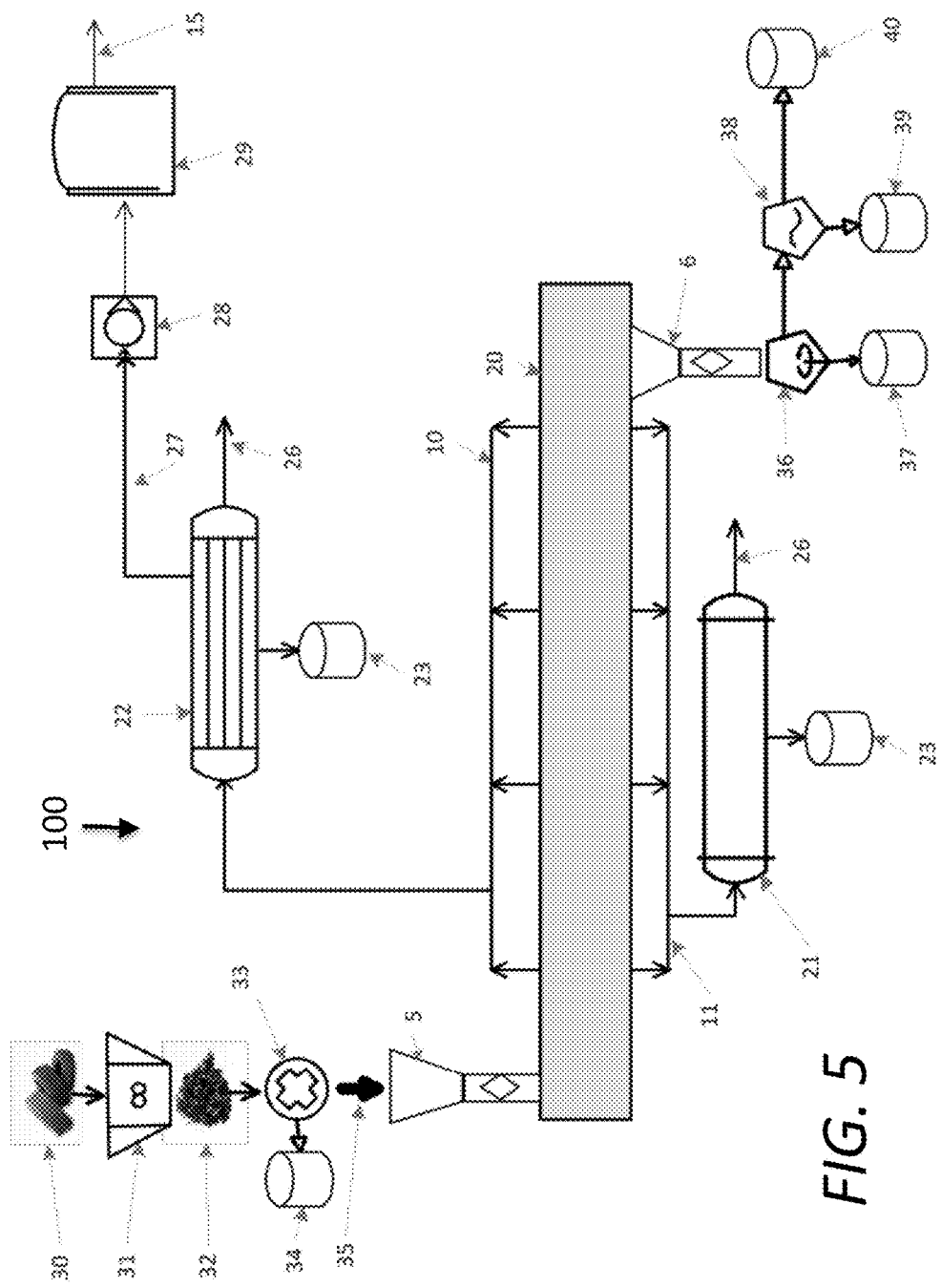
FIG. 5 is a schematic diagram showing an embodiment of the disclosed reactor with airlocks and pre-processing steps included.

The reactor 100 may include one or more components for collecting products extracted from the scrap tire material. The solid products may be extracted from the cooling down post-processing zone 4. There may be a tube 6 that permits solid materials to exit the cooling down zone 4 under the influence of gravity. The tube 6 may have a funnel-like portion. The tube 6 may have an airlock; the airlock may maintain the low-oxygen atmosphere within the reactor 100. As shown in FIG. 5, the reactor 100 may include an oil and water separator 21, or an oil, gas, and water separator 22; gas may be removed by a gas pump 28 to a gas storage tank 29. Separated oil may be stored in at least one oil receiver 23. A scrubber (not shown) may separate gases from each other. Solid materials may be sorted by various components as well. For instance, an output metal separator 36 may remove metal (if it was not removed before pre-processing zone) from the solid products, and deposit the metal in an output metal receiver 37. The remaining and separated ash may be deposited in an output solid ash material receiver 39. Carbon black may be deposited in a carbon black receiver 40.

In some embodiments, the reactor 100 also includes one or more components that process the scrap tire material prior to entry in the reactor 100. A shredder 31 may break the scrap tire down into small pieces, increasing the surface area of the scrap tire material for more efficient conversion process. In some embodiments, a metal separator 33 removes reinforcing metals from the scrap tire material prior to the entry of the scrap tire material into the reactor; the metal may be stored in a metal receiver 34. The reactor 100 may include a component (not shown) for extracting textile material; for instance, the reactor 100 may include a fluff-removal machine (not shown). The scrap tire may enter the reactor 100 through a loading hopper 5; the hopper 5 may include an airlock, which may maintain the low-oxygen environment within the reactor 100.

Figure 6:
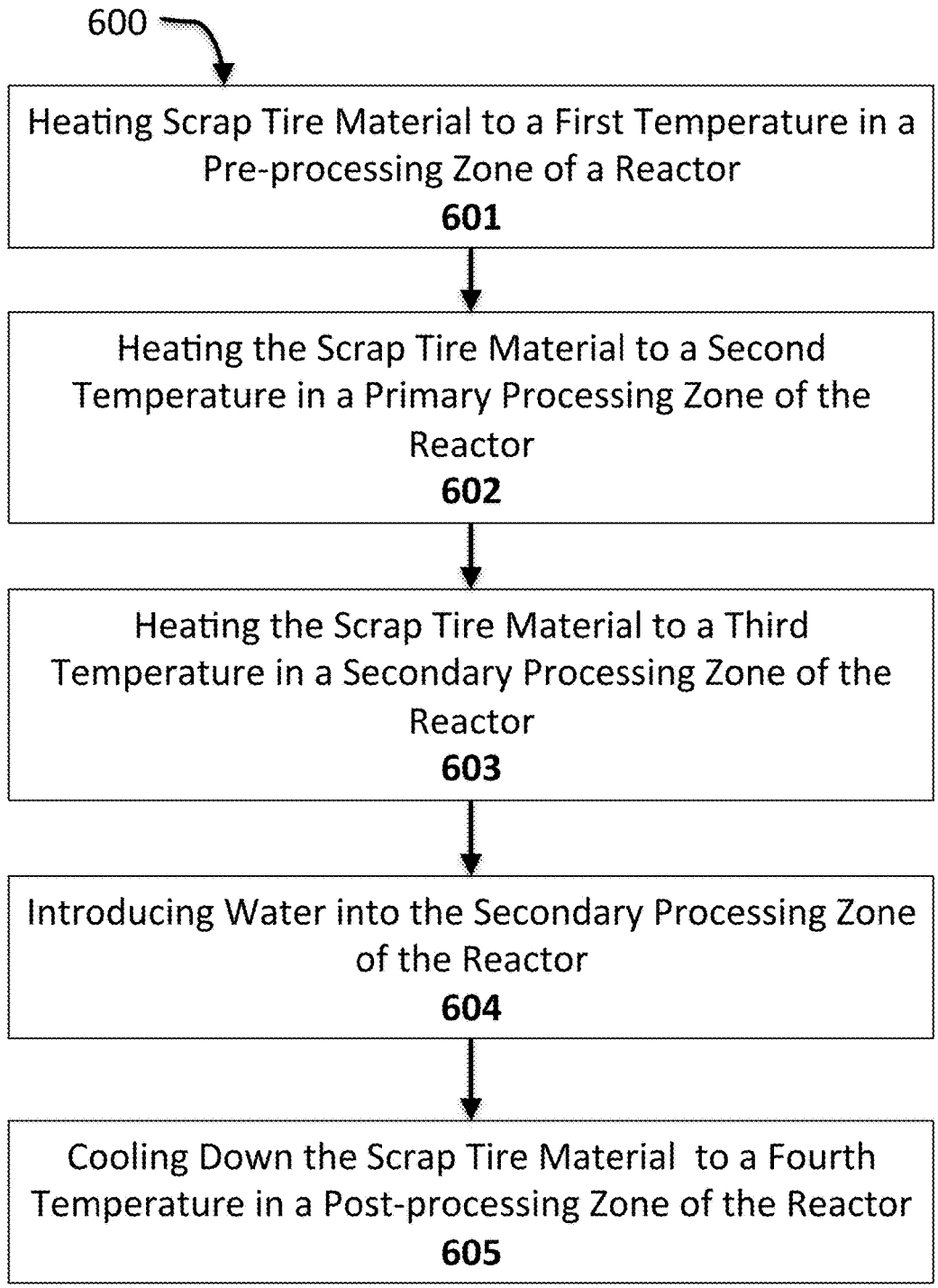
FIG. 6 is a flow diagram illustrating one embodiment of the disclosed method for conversion of scrap tire material.

FIG. 6 is a flow chart illustrating one embodiment of the disclosed method 600 for tire conversion into output products. The method 600 includes heating scrap tire material to a first temperature in a pre-processing zone of a reactor (601). The method 600 includes heating the scrap tire material to a second temperature in a primary processing zone of the reactor (602). The method 600 includes heating the scrap tire material to a third temperature in a secondary processing zone of the reactor (603). The method includes introducing water into the secondary processing zone of the reactor (604). The method 600 includes cooling down the remaining material to a fourth temperature in a post-processing zone of the reactor (605).

Reviewing FIG. 6 in further detail, and by reference to FIGS. 1A-5, the method 600 includes heating scrap tire material to a first temperature in a pre-processing zone of a reactor (601). In some embodiments, the scrap tire material is placed in a hopper 5, as shown in FIGS. 1A, 3A-B, 4, and 5; the scrap tire material may be placed in the hopper 5 by hand, or by another mechanical device (not shown) such as a conveyor belt. The scrap tire material may be broken into pieces by cutting, tearing, or crumbling prior to insertion in the hopper 5. In some embodiments, the scrap tire material is shredded in a tire shredder 31 prior to insertion into the hopper. The shredder 31 as shown in FIG. 5, may shred the tire into large pieces, for which the maximum of the length, width, or depth is 10-20 centimeters. The shredder 31 may shred the tires into moderately sized pieces, for which the maximum of the length, width or depth is 4-10 centimeters. The shredder 31 may shred the tires into small pieces, for which the maximum of the length, width, or depth is 0.5 to 4 centimeters, or into crumbles, for which the maximum of the length, width, or depth is 2-5 millimeters.

In some embodiments, metal material, such as reinforcing steel, is removed from the scrap tire material before the insertion of the scrap tire material into the pre-processing zone 1. This may be performed by the metal reinforcement extractor 33 and metal reinforcement receiver 34 of FIG. 5. In some embodiments, textile material is removed from the scrap tire material prior to insertion in the pre-processing zone 1, of FIG. 1A.

In some embodiments, the first temperature is between 300 degrees Celsius and 450 degrees Celsius. The scrap tire material may reach this temperature by gradually heating up as it passes through the pre-processing zone. In some embodiments, the scrap tire material reaches the first temperature at approximately the midpoint of its trip through the pre-processing zone 1, of FIG. 1A.

The method 600 includes heating the scrap tire material to a second temperature in a primary processing zone of the reactor (602). The second temperature may be between 700 degrees Celsius and 890 degrees Celsius. The scrap tire material may gradually heat up to the second temperature as it passes through the primary processing zone 2. In some embodiments, where the beginning of the primary processing zone 2, of FIG. 1A, is near to the end of the pre-processing zone, for instance where the pre-processing zone 1, of FIG. 1A, and the primary processing zone 2 are contained in the same tube, the higher temperature of the primary processing zone 2 may cause heat to spread to the pre-processing zone 1; this may create an increasing temperature gradient in the pre-processing zone 1 in the direction of movement of the scrap tire material. In other embodiments, for instance where the pre-processing zone 1 is contained in a different tube from the primary processing zone 2, the higher temperature of the primary processing zone 2 may have no or negligible effect on the temperature of the pre-processing zone 1.

In some embodiments, water is introduced into the primary processing zone 2. The water may be introduced in the form of liquid water. The water may be introduced in the form of water vapor. The water may be introduced in the form of a combination of water vapor and liquid water.

The method 600 includes heating the scrap tire material to a third temperature in a secondary processing zone of the reactor (603). In some embodiments, the third temperature is between 700 degrees Celsius and 890 degrees Celsius; at this temperature, carbon back may be produced from the tire scrap material. The carbon black may also be refined at this temperature. In some embodiments, ash is produced at this stage; the ash may be removed as described below. The ash may be produced from silicone additives or other materials incorporated in the scrap tire material.

In some embodiments, the addition of water produces carbon black with high porosity. For instance, the porosity of the carbon black may be such that the difference between the nitrogen surface area (N2SA) and the statistical thickness surface area (STSA) is between 90 $m^2/g$ and 250 $m^2/g$.

In a further embodiment, the third temperature is 900 degrees Celsius or higher; at this temperature the carbon black may be converted into volatile material, including gases. The volatile materials may include flammable gases. The gases may include hydrogen gas (H2). The gases may include carbon monoxide (CO). The gases may include carbon dioxide (CO2). The gases may include methane (CH4). The gases may include ethane (C2H6). The gases may include propane (C3H8). The gases may also include small quantities of other gases.

The method includes introducing water into the secondary processing zone of the reactor (604). The water may be introduced as liquid, vapor, or a combination of water vapor and liquid water. In some embodiments, introduction of water in a temperature range of 700 degrees Celsius to 890 degrees Celsius ensures that the carbon black produced in that process will be of superior quality; the water may assist in producing higher quality carbon black by functioning as a chemical reagent. Water mass may be introduced in the range between 0% and 150% of the material mass per second, with the temperature at a level between 700 C and 890 C at certain stages of the material conversion. Lower water quantities and lower temperatures may contribute to production of carbon black material approximating N7XX or N6XX ASTM grades. Higher water quantities and higher temperatures may contribute to production of carbon black material approximating N2XX or N1XX ASTM grades.

Where the third temperature is above 700 degrees Celsius, the introduction of water steam may cause hydrogen and oxygen from the water to combine with carbon from the scrap tire material to form a greater quantity of fuel gas, according to the following formula: CnHm (solid)+H2O (gas)→H2 (gas)+CO (gas)+CO2 (gas)+CnHm (liquid)+CH4 (gas)+C2H2 (gas)+C2H6 (gas)+C3H8 (gas)+C4H10 (gas). In some embodiments, the introduction of the right amount of water into the secondary processing zone 3, of FIG. 1A, at a temperature of 900 degrees Celsius or more eliminates all but less than 1% of the solid scrap tire material, leaving a residue of ash.

FIG. 7A is a temperature graph illustrating materials extracted from the scrap tire material in one embodiment where the temperature in the secondary processing zone is between 700 and 890 degrees Celsius; the particular proportions illustrated are for exemplary purposes only, and in practice may depend on the material composition of the scrap tire material as described above in reference to FIGS. 1A-5. The total mass of output product is greater than 100% of the source tire material mass because additional matter is contributed from water, as described above in further detail.

FIG. 7B is a temperature graph illustrating materials extracted from the scrap tire material in one embodiment where the temperature in the secondary processing zone is above 900 degrees Celsius; the particular proportions illustrated are for exemplary purposes only, and in practice may depend on the material composition of the scrap tire material as described above in reference to FIGS. 1A-5. The total mass of output product is greater than 100% of the source tire material mass because additional matter is contributed from water, as described above in further detail.

The method 600 includes cooling down the remaining material to a fourth temperature in a post-processing zone of the reactor (605). The fourth temperature may be between 80 degrees Celsius and 300 degrees Celsius. The temperature may drop further during the extraction of materials as described in further detail below.

Some embodiments of the method involve mechanically agitating the scrap tire material. The one or more material mixing blades 4, for instance as shown in FIGS. 2A-D may agitate the scrap tire material as it passes through the transport mechanism 12. Likewise, where the transport mechanism 12 has integrated sections, each featuring both material advancing and mixing blades, the transport mechanism 12 may mechanically agitate the scrap tire material. In some embodiments, agitating the scrap tire material helps to increase exposure of the surface area of the scrap tire material to the heat and water presented by the environment within the reactor 100. Agitation of the scrap tire material may also ensure that the scrap tire material is evenly heated and exposed to heat and water.

The atmosphere within the reactor 100 may be substantially isolated from the outside air. In some embodiments, the method includes maintaining an environment substantially free of gaseous oxygen within the reactor. The substantially oxygen-free atmosphere may be maintained using airlocks in the input hopper 5 and in the output tube 6 as shown in FIGS. 1A, 3A-B, 4, and 5. In some embodiments, the method includes maintaining a normal pressure within the reactor; a normal pressure may be a pressure substantially equal to the pressure outside of the reactor. As a non-limiting example, a normal pressure within a reactor at sea level may be approximately 1 Atmosphere (101,325 Pa).

Some embodiments involve removing metal from the scrap tire material in the post-processing zone 4 of FIG. 1A. The metal may be removed using the output metal remover 36 and output metal receiver 37, as shown in FIG. 5. In embodiments where the metal was removed prior to insertion in the pre-processing zone 1 of FIG. 1A, metal may not be present for removal in the post-processing zone 4 of FIG. 1A. In some embodiments, the method involves removing ash from the scrap tire material in the post-processing zone; the removed ash may be placed in the output solid ash material receiver 39 of FIG. 5. Some embodiments involve removing carbon black from the post-processing zone 4 of FIG. 1A. The carbon black may be removed to the output carbon black receiver 40 of FIG. 5.

The process may involve converting the scrap tire material into volatile liquid and gaseous matters as well as solid matter. In some embodiments, the method 600 involves separating out gaseous material released by the scrap tire material. This may be accomplished using the gas pump 28 of FIG. 5. In some embodiments, the gas is separated from oils and water steam, which may be performed using the oils, water steam, and gas separator 22 of FIG. 5. Different types of gas, such as hydrogen gas and carbon monoxide, may be separated from each other using a device such as a scrubber (not shown). The gases removed may include, without limitation, carbon dioxide, carbon monoxide, methane, hydrogen gas, and other flammable gases. In some embodiments, the method 600 involves separating out liquid released by the scrap tire material; in some embodiments, most of the liquid is produced in the primary and secondary processing zones. The liquid may be separated using the oil and water separator 21 of FIG. 5 or using the oil, gas, and water separator 22 of FIG. 5. In some embodiments, the method involves separating liquid material into a plurality of oil fractions with different densities; this may be accomplished using the oil and water separator 21 or the oil, gas, and water separator 22. In some embodiments, the oil is separated into heavy, medium and light oils.

In some embodiments, the extracted gases are used as fuel to heat the reactor 100; for instance, the extracted hydrogen gas, methane, or other flammable gases may be fed into the gas jets 16 as fuel gas 15, as shown in FIG. 5. The extracted gases may be combusted to heat the reactor 100. In other embodiments, the extracted gases are stored, for instance for commercial use. Likewise, the extracted oils may be used as fuel to heat the reactor 100; the extracted oils may be combusted. In other embodiments, the extracted oils are stored, for instance for commercial use.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed is:

1. A method for converting scrap tire material into carbon black and other materials, the method comprising:
    heating scrap tire material to a first temperature in a pre-processing zone of a reactor;
    heating the scrap tire material to a second temperature in a primary processing zone of the reactor;
    heating the scrap tire material to a third temperature of at least 700 degrees Celsius in a secondary processing zone of the reactor;
    introducing water to the secondary processing zone of the reactor while maintaining the scrap tire material at the third temperature; and
    cooling down the solid remains to the fourth temperature in a post-processing zone of the reactor.

2. The method of claim 1 wherein the first temperature is between 300 and 700 degrees Celsius.

3. The method of claim 1, wherein the second temperature is between 700 degrees Celsius and 890 degrees Celsius.

4. The method of claim 1, wherein the third temperature is between 700 and 890 degrees Celsius.

5. The method of claim 1, wherein the third temperature is 900 degrees Celsius or higher.

6. The method of claim 1, wherein the scrap tire material is introduced to the secondary processing zone at a first rate of mass per second, and further comprising varying the rate in mass per second of the introduction of water to control quality of produced materials.

7. The method of claim 1 further comprising introducing water to the primary processing zone.

8. The method of claim 1 further comprising maintaining near normal atmospheric pressure within the reactor.

9. The method of claim 1 further comprising continuously mixing the scrap tire material throughout the primary processing zone.

10. The method of claim 1 further comprising continuously mixing the scrap tire material throughout the secondary processing zone.

11. The method of claim 1 further comprising advancing the scrap tire material through each of the pre-processing zone, the primary processing zone, the secondary processing zone, and the post-processing zone.

12. The method of claim 11, wherein advancing the scrap tire material further comprises advancing the scrap tire material at a different speed in each of the four zones.

13. The method of claim 11, wherein advancing the scrap tire material further comprises advancing the scrap tire material at the same speed in at least two of the four zones.

14. The method of claim 1 further comprising removing ash from carbon black converted from the scrap tire material.

15. The method of claim 1 further comprising removing metal from carbon black converted from the scrap tire material.

* * * * *